United States Patent
Betlem et al.

(10) Patent No.: US 9,115,893 B2
(45) Date of Patent: Aug. 25, 2015

(54) PROCESS FOR INCINERATING NH3 AND A NH3 INCINERATOR

(75) Inventors: Maarten Betlem, Wateringen (NL); Sjaak Olsthoorn, Wateringen (NL); Mark Van Welsen, Wateringen (NL)

(73) Assignee: Duiker Combustion Engineers B.V., Wateringen (NL)

( * ) Notice: Subject to any disclaimer, the term of this patent is extended or adjusted under 35 U.S.C. 154(b) by 0 days.

(21) Appl. No.: 14/343,808

(22) PCT Filed: Sep. 7, 2012

(86) PCT No.: PCT/NL2012/050626
§ 371 (c)(1),
(2), (4) Date: May 9, 2014

(87) PCT Pub. No.: WO2013/036124
PCT Pub. Date: Mar. 14, 2013

(65) Prior Publication Data
US 2014/0248202 A1 Sep. 4, 2014

(30) Foreign Application Priority Data
Sep. 9, 2011 (NL) ...................................... 2007381

(51) Int. Cl.
| | | |
|---|---|---|
| F23G 7/06 | (2006.01) |
| F23J 15/02 | (2006.01) |
| F23N 5/00 | (2006.01) |
| B01D 53/58 | (2006.01) |
| B01J 12/00 | (2006.01) |
| B01D 53/34 | (2006.01) |
| B01D 53/52 | (2006.01) |
| F23L 7/00 | (2006.01) |
| F23N 3/00 | (2006.01) |

(52) U.S. Cl.
CPC .............. *F23G 7/065* (2013.01); *B01D 53/346* (2013.01); *B01D 53/52* (2013.01); *B01D 53/58* (2013.01); *F23L 7/007* (2013.01); *F23N 3/002* (2013.01); *B01D 2251/102* (2013.01); *F23G 2200/00* (2013.01)

(58) Field of Classification Search
CPC .............. F23G 7/06; F23J 15/02; F23N 5/00; B01D 53/58; B01J 12/00
USPC ......................................................... 423/237
See application file for complete search history.

(56) References Cited

U.S. PATENT DOCUMENTS 6,488,905 B2 * 12/2002 Graville .......................... 423/237
6,902,713 B1    6/2005 Binoist et al.
2008/0247927 A1 10/2008 Rameshni

FOREIGN PATENT DOCUMENTS

GB        2116531 A        9/1983

* cited by examiner

*Primary Examiner* — Timothy Vanoy
(74) *Attorney, Agent, or Firm* — Barry L. Davison; Davis Wright Tremaine, LLP

(57) ABSTRACT

This invention relates to a process for incinerating NH3 in an NH3 incinerator comprising a first incineration step at controlled sub-stoichiometric incineration conditions and a second incineration step with at a greater than stoichiometric amount of oxygen, whereby a product stream is produced with reduced NO formation. The invention also relates to an NH3 incinerator.

22 Claims, 1 Drawing Sheet

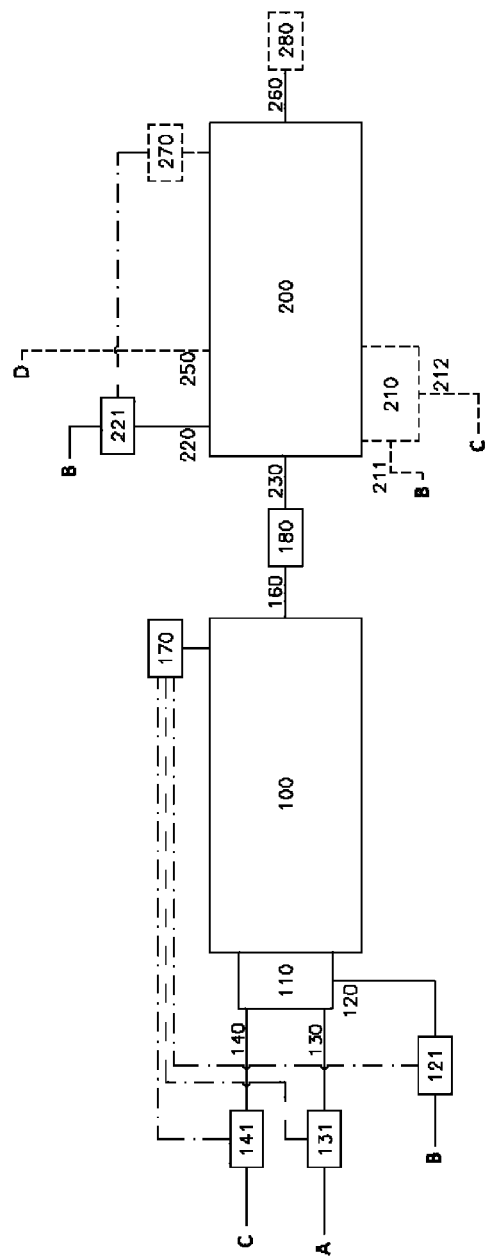

PROCESS FOR INCINERATING NH3 AND A NH3 INCINERATOR

TECHNICAL FIELD

This invention relates to NH3 incineration. More in particular, this invention relates to a process for NH3 incineration with reduced NO formation, the controlling of such a process, and to a NH3 incinerator.

CROSS-REFERENCE TO RELATED APPLICATIONS

This application is the United States national phase, under 35 U.S.C. §371, of International Patent Application No. PCT/NL2012/050626, filed 7 Sep. 2012 and entitled A PROCESS FOR INCINERATING NH3 AND A NH3 INCINERATOR, which claims the benefit of priority to Netherlands Patent Application Serial Number 2007381, filed 9 Sep. 2011 and entitled A PROCESS FOR INCINERATING NH3 AND A NH3 INCINERATOR, both of which are incorporated herein by reference in their entirety.

BACKGROUND ART

NH3 (ammonia) is a corrosive, colourless gas with a sharp odour. It occurs naturally and is also manufactured by the chemical industry. Waste gas streams comprising ammonia are frequently encountered in refineries. Sometimes such waste gas streams also contain hydrogen sulphide in comparable proportions.

NH3 may be processed in a NH3 incineration process, or alternatively in a Claus process. These two routes to NH3 destruction are different in terms of equipment requirements, in chemistry and in process conditions. Both achieve the destruction of NH3. Thus, H2S gas streams containing NH3 can be employed as a feed stream in a Claus process. The Claus process is a gas desulphurising process, recovering elemental sulphur from gaseous hydrogen sulphide. Moreover, the Claus process is a very efficient process to convert NH3 in the presence of H2S and SO2 with little or no production of NO.

Downside of the Claus process is the formation of ammonium salts when a feed is used that comprises NH3 in addition to H2S. A Claus furnace that is adapted for handling the presence of NH3 is therefore run at a higher temperature (typically with increased temperature of at least 1250° C.). Moreover, the amount of oxygen required when using a mixed gas stream versus a relatively pure H2S stream is significantly higher, thereby increasing the operational and investment costs.

According to WO2006106289 a gas stream comprising hydrogen sulphide and ammonia is passed from a stripping column to a single combustion stage or furnace of a Claus plant. The combustion is conducted under conditions that eliminate essentially all the ammonia. The combustion is supported by a gas stream containing at least 40% by volume of oxygen. In WO2008124625 oxidative and reductive methods are described for the cost-effective destruction of an ammonia-containing gas stream, potentially containing minor but significant quantities of hydrogen sulphide, in a conventional Claus sulphur recovery tail gas treating unit, using controlled rates and compositions of combustion gases in order to obtain the temperatures necessary for the desired destruction of unwanted combustibles.

In U.S. Pat. No. 6,902,713 a partial oxidation procedure is described for gas containing hydrogen sulphide and ammonia in a Claus furnace with the aid of an oxygen-rich gas. The procedure involves measuring the residual content of ammonia at the output from the furnace, i.e., after the various stages of the Claus process and irrespective of the yield and conversions during the Claus process, comparing this value with a maximum value set by the user of the Claus unit, and modifying the flow of the oxygen-rich gas in proportion to the flow of ammonia gas accordingly. The residual ammonia content is measured continuously by means of a laser diode located in the main duct or a branch sampling pipe at the outlet from the Claus furnace, with the gases from the sampling pipe re-injected into the main duct, and the flow of oxygen rich gas is modified by means of a regulating loop between the continuous measuring apparatus and an automatic controller for the regulator. This sour gas stream may contain up to 60 mol % ammonia and contains significant amounts of hydrogen sulphide.

Although the above mentioned processes for treating waste streams containing hydrogen sulphide and ammonia have the advantage of eliminating essentially all the ammonia, unfortunately a Claus furnace is not always available. Moreover, a typical Claus furnace is rather complex, comprising several stages for partial combustion of hydrogen sulphide and for carrying out the Claus reaction of hydrogen sulphide with sulphide dioxide to form elemental sulphur, several condensers to recover elemental sulphur, and several reheaters to warm up the remaining gases prior to subsequent reactions. In other words, although in the aforementioned references improved Claus processes and furnaces have been described that make possible the virtual complete incineration of NH3 without NO, the downside is the investment of a relatively expensive Claus furnace and the equipment downstream of the Claus furnace, moreover run at relatively high operational costs. Finally, as is shown in U.S. Pat. No. 6,902,713, even a Claus process generally requires an incinerator for treatment of the tail gas of the Claus process.

A dedicated NH3 incinerator is more attractive than a Claus process for the treatment of waste gas streams comprising NH3 as the major or sole combustible component. However, the problem of NH3 incinerators is that oxides of nitrogen may be formed during the combustion. There is a need to destroy essentially all of the ammonia in such gas streams but without creating appreciable amounts of oxides of nitrogen in the effluent gas arising from the incineration process.

In GB2116531 a process and apparatus is described for the simultaneous disposal of NH3 containing waste gas and combustible sulphur compounds-containing waste gas. In this process combustion is carried out in three separate steps, with the combustion of the sulphur compounds-containing waste gas in the third step. In a first incineration step, the waste gas containing NH3 is combusted in the presence of a fuel gas with a first, sub-stoichiometric amount of free oxygen in the incinerator. Next, the combustion gases are mixed with a second amount of free oxygen, the total of the first and second amount being super-stoichiometric and combusting the mixture in a second incinerator. No information is provided or suggested how to optimize the combustion efficiency with further reduced NO formation.

In JP49042749 combustion of ammonia with air is described in two stages with intermediate cooling.

From EP 1106239 an alternative process is known. A gas stream containing at least 50% by volume of ammonia but less than 5% by volume of hydrogen sulphide is burned in a reaction region which is supplied with oxygen and oxygen-enriched air. Both combustion and thermal cracking of ammonia takes place in the reaction region. The rate of supplying oxygen to the reaction region is from 75 to 98% of the stoichiometric rate required for full combustion of all combustible fluids supplied to the reaction region; the ratio of oxygen to ammonia is therefore even less. The effluent from the reaction region is subsequently burned (with preferably pure oxygen or oxygen enriched air) and discharged to the atmosphere. Under these conditions essentially no ammonia remains in the effluent gas whereas formation of oxides of nitrogen can be minimised. This process therefore requires pure oxygen or oxygen enriched air. A process for incinerating NH3 that does not rely on pure oxygen or oxygen enriched air would be more attractive. Still it would be desirable to reduce the amount of NO to 100 ppm or less, preferably less than 50 ppm.

The current inventors set out to optimize the process for incinerating NH3, e.g., a stream containing at least 30 vol % NH3 and preferably containing no more than 40 vol % H2S, whereby NO formation is reduced to less than 100 ppm NO. This problem has been solved as follows.

BRIEF DESCRIPTION OF THE DRAWINGS

FIG. 1 is a simplified representation of the NH3 incinerator of the current invention.

DISCLOSURE OF THE INVENTION

The invention provides a process for incinerating NH3 in an NH3 incinerator comprising:
a. a first incineration step comprising:
i. reacting a gas stream comprising NH3 and optionally a fuel stream under incineration conditions with a first oxygen containing stream, at a sub-stoichiometric amount of oxygen in the first oxygen-containing stream with respect to the NH3 in the gas stream, whereby a first product stream is produced;
ii. analyzing the composition of the first product stream for content of residual NH3 and/or formed HCN and/or formed NO, and
iii. adjusting the first oxygen-containing stream and/or the gas stream comprising NH3 and/or the fuel stream, if any, based on the analysis of the first product stream so as to produce a first product stream containing both residual NH3 and NO, but no more than 250 ppm H N3 and no more than 250 ppm NO; and
b. a second incineration step comprising
i. reacting the first product stream under incineration conditions with a second oxygen-containing stream at a greater than stoichiometric amount of oxygen, whereby a second product stream is produced.

The process is particularly suitable for waste gas streams containing significant amounts of NH3 and relatively low amounts of H2S, if any. Also provided is an NH3 incinerator suitable for the process according to the invention.

Shown in FIG. 1 is an NH3 incinerator comprising a first reactor zone 100 comprising: a burner 110 for incinerating NH3; an inlet 120 at the burner 110 for a first oxygen-containing stream (B), provided with a first oxygen control means 121 for adjusting the amount of the oxygen-containing stream; an inlet 130 at the burner 110 for a gas stream (A) comprising NH3 optionally provided with a first NH3 control means 131 for adjusting the amount of the NH3-containing stream; optionally an inlet 140 at the burner 110 for a fuel stream (C) optionally provided with a first fuel control means 141 for adjusting the amount of the fuel stream; an outlet 160 downstream of the reaction zone 100 for a first product stream prepared in the reaction zone 100; an analyser 170 at the end of the reaction zone 100 capable of analyzing the content of NH3 and/or HCN and/or NO in the first product stream prepared in the reaction zone 100 and capable of adjusting one or more of the first control means 121, 131 and 141; and optionally a temperature control means 180 downstream of the reaction zone 100 (e.g., in the form of a quench unit or waste heat boiler for recovery of reaction heat); and further comprising a second reaction zone 200 downstream of the reaction zone 100 for incinerating the first product stream prepared in the reaction zone 100, comprising an inlet 230 at the start of the reaction zone 200 for the first product stream prepared in the reaction zone 100; comprising an inlet 220 at the start of the reaction zone 200 for a second oxygen-containing stream (B), optionally provided with a second control means 221 for adjusting the amount of the second oxygen-containing stream; optionally comprising a second burner 210; provided with an inlet 211 at the second burner 210 for a third oxygen-containing stream (B), and an inlet 212 at the second burner 210 for a second fuel stream (C); optionally an inlet 250 at the start of the reaction zone 200 for a waste stream (D); an outlet 260 downstream of the reactor zone 200 for a second product stream prepared in the reaction zone 200; optionally an analyser 270 at the end of the reactor zone 200 capable of analyzing the content of oxygen in the second product stream prepared in the reaction zone 200 and preferably capable of adjusting the second control means 221; and optionally a waste heat boiler 280 downstream of the reactor zone 200 for recovery of reaction heat.

MODES FOR CARRYING OUT THE INVENTION

Preferred embodiments are described herein below.

Incineration conditions are known. Typically, NH3 is incinerated at atmospheric pressure. The reaction is exothermic and typically reaches a temperature of about 1500° C., depending on the additional components (e.g. added fuel) of the NH3 containing stream. The process is particularly interesting for waste streams comprising at least 30 volume %, preferably at least 50 volume % NH3, more preferably at least 60 volume % NH3. The gas stream may comprise some H2S, preferably at most 40 volume % H2S, more preferably at most 5 volume % H2S. Gas streams containing more H2S are more suitably treated in a Claus furnace. Suitable sources of NH3 containing gas streams are for instance streams from a sour water stripper.

In FIG. 1, a simplified representation of a NH3 incinerator of the current invention is shown.

To start the reaction, a fuel stream is ignited together with oxygen in the reactor zone 100 to reach the desirable incineration conditions. For incinerating NH3 in reactor zone 100 a temperature in the range of 950 to 1700° C., preferably in the range of 1200 to 1400° C. is preferred. Below 950° C. stable combustion of the NH3-containing stream will be difficult. Above 1700° C., commonly applied refractory lining materials that are used for heat insulation are not suitable. After a suitable temperature has been reached an NH3 containing stream is introduced. Fuel may be mixed with the NH3 containing stream, whereupon it co-reacts with the first oxygen-containing stream. For instance, it is beneficial to add fuel if the NH3 containing stream contains water. The presence of water may reduce the exotherm reached in the reactor. The amount of fuel to NH3 containing stream is therefore such as to maintain a reaction temperature in the range of 950 to 1700° C., preferably in the range of 1200 to 1400° C. For the embodiment described hereafter, it is assumed that the NH3 containing stream is substantially free from water. Addition of a fuel gas is therefore not required. Ideally NH3 is incinerated without formation of NO or by-products such as HCN according to the following reaction:

$$4\ NH_3 + 3\ O_2 \rightarrow 2\ N_2 + 6\ H_2O$$

Ideally, the weight ratio of NH3 to oxygen is about 2:3 (i.e., 4*17:3*32). However, the content of the NH3 in the NH3 containing stream is typically less than 100%, whereas generally air from the plant is used as the oxygen containing stream at an oxygen content of about 20 vol %, rather than pure oxygen. Typically, the weight ratio of the NH3 containing stream to the oxygen containing stream is therefore about 1:6. The content of the NH3 in the NH3 containing stream may fluctuate over time, however, as may the content of other components. To maintain more or less steady state conditions, the analyser 170 adjusts the first control means 121 (e.g., a valve, or a series of valves) which modifies the amount of oxygen introduced in reaction zone 100. In an alternative embodiment, the analyser 170 adjusts the first control means 131 which modifies the amount of NH3 introduced in reaction zone 100. In a further alternative embodiment, the analyser 170 adjusts the first control means 141 (which modifies the amount of fuel introduced in reaction zone 100. Also a combination of adjusting two or more of the first control means is possible. If there are no other combustible components in the reaction zone 100, then the oxygen is supplied at a rate to reach a level of 95 to 98% of the stoichiometric rate required for incineration of all the NH3. If the NH3 containing stream comprises additional combustible components, like fuel, then the amount of oxygen should be increased up to an amount of oxygen in the range of 50 to 99% of stoichiometry with respect to the combustible components that are present in the gas streams. Using the analyser 170 in accordance with the current invention has the advantage that the amount of reactants can be adjusted, despite the rather complex interrelation when there are multiple components and hence multiple reactions taking place at changing incineration conditions. For instance, the amount of oxygen may be adjusted by increasing the weight ratio of oxygen to the NH3 containing stream. Alternatively, the air used as oxygen stream may be enriched in oxygen.

The oxygen-containing stream may be introduced thru one or more inlets, but introducing thru one inlet suffices. The residence time of the reactants in reaction zone 100 can be short, i.e. 1 second or less, even 0.2 seconds or less.

Various analysers may be used as analyser 170. Preferably, the analyser 170 is a laser diode, which analyses the residual NH3 content at the end of the reaction zone 100. The analysis may be carried out at intervals and the like, or continuously. When a short response time is needed, for instance because of rapid changes in the content of the reactant feed streams, then the analysis is preferably continuously or semi-continuously (e.g., once every 5 seconds or at shorter intervals). The analysis may be carried out in a bypass or in the reaction zone 100. In a bypass the conditions for analysing the first product can be kept constant, which improves the reliability. On the other hand, analysing in the reaction zone 100 provides a shorter response time to changes in the composition of the gas stream and hence better control of the incineration conditions.

In accordance with the current invention, NH3 is incinerated in reactor zone 100 close to completion, but not entirely. There is still some residual NH3. If the incineration is completed to the extend that the residual NH3 content is (about) nil, then the production of NO has already started and it was found that the overall production of NO may be too high. If the incineration in reactor zone 100 is not carried out long enough, then the gas stream will have a high NH3 content which will lead to a high NO content when this gas stream is combusted in the reactor zone 200. In other words, the inventors have found out that to reduce the NO in the end product, the reaction in the first stage should continue until some NO is produced. In a preferred embodiment the first oxygen-containing stream and/or any of the other reactant feed streams are adjusted to result in an NH3 content in the first product stream of less than 100 ppm, more preferably less than 50 ppm. Alternative analysers may be used, that adjust the first oxygen-containing stream on the basis of other components possibly present in the first product stream, such as HCN or NO. For instance, when a propane/air flame with a NH3 content of 4% is incinerated, resulting in HCN as a combustion product, then one or more reactant feed streams may be adjusted to result in a HCN content in the first product stream of less than 1400 ppm preferably less than 1000 ppm. Likewise, one or more of the reactant feed streams may be adjusted to result in an NO content in the first product stream of less than 200 ppm, preferably less than 100 ppm.

A temperature is maintained in the second reaction zone 200 that is preferably in a range of from 800 to 1100° C., more preferably in the range of 850 to 1000° C. Oxygen is supplied in an amount to ensure full incineration. If the reaction temperature as a result of the incineration of the combustible components in the first product stream drops below the lower limit, then it may be advantageous to add fuel. It may also be advantageous to quench the temperature in the reaction zone 200, e.g., by adding water to any of the feed streams. As described in more detail hereinafter, a very effective use of the elevated temperature of the first product stream is to warm a further waste stream which is then incinerated in reaction zone 200.

The design of the incinerator burner 110 in the reaction zone 100 and the optional incinerator burner 210 in the reaction zone 200 is not particularly relevant. Various types of incinerator burners may be used. Preferably, a burner is used that mixes the combustible stream(s) and the oxygen containing stream. The burner may be equipped with an ignitor. The design of the reaction zones 100 and 200 is not particular relevant either. In fact, the NH3 incinerator may have both reaction zones as part of a single reactor vessel or comprise two separate reactor vessels that are connected.

The present invention also covers the NH3 incinerator used in the process described above, comprising a first reactor zone 100 comprising: a burner 110 for incinerating NH3; an inlet 120 at the burner 110 for a first oxygen-containing stream, provided with a first oxygen control means 121 for adjusting the amount of the oxygen-containing stream; an inlet 130 at the burner 110 for a gas stream comprising NH3 optionally provided with a first NH3 control means 131 for adjusting the amount of the NH3-containing stream; optionally an inlet 140 at the burner 110 for a fuel stream optionally provided with a first fuel control means 141 for adjusting the amount of the fuel stream; an outlet 160 downstream of the reaction zone 100 for a first product stream prepared in the reaction zone 100; an analyser 170 at the end of the reaction zone 100 capable of analyzing the content of NH3 and/or HCN and/or NO in the first product stream prepared in the reaction zone 100 and capable of adjusting one or more of the first control means 121, 131 and 141; and optionally a temperature control means 180 downstream of the reaction zone 100 (e.g., in the form of a quench unit or waste heat boiler for recovery of reaction heat); and further comprising a second reaction zone 200 downstream of the reaction zone 100 for incinerating the first product stream prepared in the reaction zone 100, comprising an inlet 230 at the start of the reaction zone 200 for the first product stream prepared in the reaction zone 100; comprising an inlet 220 at the start of the reaction zone 200 for a second oxygen-containing stream, optionally provided with a second control means 221 for adjusting the amount of the second oxygen-containing stream; optionally comprising a second burner 210; provided with an inlet 211 at the second burner 210 for a third oxygen-containing stream, and an inlet 212 at the second burner 210 for a second fuel stream; optionally an inlet 250 at the start of the reaction zone 200 for a waste stream; an outlet 260 downstream of the reactor zone 200 for a second product stream prepared in the reaction zone 200; optionally an analyser 270 at the end of the reactor zone 200 capable of analyzing the content of oxygen in the second product stream prepared in the reaction zone 200 and preferably capable of adjusting the second control means 221; and optionally a waste heat boiler 280 downstream of the reactor zone 200 for recovery of reaction heat.

Each of the reaction zones 100 and 200, the latter in particular, may be equipped with a waste heat boiler, to recover energy.

As mentioned above, in the second incineration step additional waste gasses may be introduced. Examples thereof include tail gasses from other processes, for instance the tail gas of a Claus unit. This is particularly beneficial as it allows the economical use of the heat of the reaction generated in the first incineration step to warm the relatively cold waste gasses.

The NH3 incinerator of the current invention may comprise both reaction zones as part of a single reactor vessel. Alternatively, each reaction zone is a separate reactor vessel wherein both reactor vessels are connected. Preferably, the incinerator comprises one or more waste heat boilers, to reclaim energy. If there are additional combustible waste gases that need to be treated, then the incinerator preferably comprises an inlet 250 for such combustible waste gases. Finally, the NH3 incinerator may be provided with an oxygen analyser 270 to adjust the second oxygen-containing stream and/or the third oxygen-containing stream, if any. This may be useful to adjust the amount of the second/third oxygen containing stream, thereby ensuring that at least a stochiometric amount of oxygen, but preferably an excess amount of oxygen is present in the second incineration step. Preferably, the total amount of the second and/or third oxygen containing stream is such that a residual amount of at least 0.5 vol % oxygen is found in the second product stream. Additional analysers may be used, to ensure the second product stream may be safely released into the atmosphere.

Examples

The following example is included for illustrative purposes only.

A NH3 stream at a rate of 1.95 $Nm^3$/hr was introduced together with a C3H8 stream at a rate of 0.034 $Nm^3$/hr into reaction zone 100 of an NH3 incinerator. Also introduced was a sub-stoichiometric amount of a first oxygen/containing stream at a rate of 6.9 $Nm^3$/hr. A first incineration step took place at a temperature of approx 1000° C., and at ambient pressure. The first product stream was reacted with a second oxygen/containing stream. The second oxygen-containing stream was supplied at an amount greater than stoichiometric with the result that the oxygen content measured at the end of the reaction zone was 3 vol % (measured in dry flu gas). The second incineration step took place at a temperature of 840° C. and at ambient pressure.

Without analyser and thus without adjusting the oxygen feed ratio in the first incineration step a second product stream was obtained having an NO content varying between 0 and 270 ppm and a NH3 content varying between 0 and 275 ppm When the same experiment was repeated, but now with a laser diode used as analyser 170 set to adjust the oxygen feed ratio based on a residual NH3 content downstream of the reaction zone 100 of 100 ppm, a second product stream was obtained having a NO content of less than 50 ppm and a NH3 content of 0 ppm.

Model experiments (first incineration step only) were repeated twice in a similar fashion as described above. First, an NH3 stream was incinerated, but now with an oxygen feed ratio wherein in the first incineration step a first product stream was obtained having an NO content of 0 ppm In a second experiment an oxygen feed ratio was used to generate a first product stream with an NH3 content of 0 ppm. The first experiment shows that the formation of NO during the first stage can be avoided, but only at the detriment of insufficient NH3 combustion. If this first product stream would be incinerated in a second step with greater than stoichiometric amounts of oxygen to achieve full NH3 combustion, then the NO content would be greater than 50 ppm. In the second experiment the NO content is greater than 50 ppm already in the first product stream. Achieving a low NO content is no longer possible. Only if the first incineration is carried out to the extent that a limited amount of NO is produced, is it possible to achieve the desired results of the current invention. The results of these model experiments are set out in the below table.

|   | NH3 capacity $Nm^3$/h | Air capacity $Nm^3$/h | NH3 content ppm | NO content ppm |
|---|---|---|---|---|
| 1 | 2.20 | 5.86 | 1172 | 0 |
| 2 | 2.06 | 5.98 | 2 | 1185 |

The invention claimed is:

1. A process for incinerating $NH_3$ in an $NH_3$ incinerator comprising:
   a. a first incineration step comprising:
      i. reacting a gas stream comprising $NH_3$ or reacting the gas stream comprising $NH_3$ together with a fuel stream, under incineration conditions, with a first oxygen containing stream, at a sub-stoichiometric amount of oxygen in the first oxygen-containing stream with respect to the $NH_3$ in the gas stream, whereby a first product stream is produced;
      ii. analyzing the composition of the first product stream for content of residual $NH_3$ and/or formed HCN and/or formed NO, and
      iii. adjusting one or more of the streams based on the analysis of the first product stream so as to produce an adjusted first product stream containing both residual $NH_3$ and NO, but no more than 250 ppm $NH_3$ and no more than 250 ppm NO; and
   b. a second incineration step comprising
      i. reacting the adjusted first product stream under incineration conditions with a second oxygen-containing stream at a greater than stoichiometric amount of oxygen, whereby a second product stream is produced.

2. The process of claim 1, wherein the gas stream comprises a volume % $NH_3$ amount selected from the volume % group consisting of at least 30 volume %, at least 50 volume %, and at least 60 volume %.

3. The process of claim 2, wherein the gas stream comprises a volume % $H_2S$ amount selected from the volume % group consisting of at most 40 volume % $H_2S$, and at most 5 volume % $H_2S$.

4. The process of claim 1, wherein the amount of oxygen is in the range of 50 to 99% of stoichiometry with respect to the combustible components that are present in the gas streams.

5. The process of claim 4, wherein $NH_3$ is the only combustible component and the amount of oxygen is in the range of 95 to 98% of stoichiometry with respect to the $NH_3$ in the gas stream.

6. The process of claim 1, wherein the first product stream is analysed for residual $NH_3$ content.

7. The process of claim 1, wherein the first product stream is analysed for formed HCN content.

8. The process of claim 1, wherein the first product stream is analysed for formed NO content.

9. The process of claim 6, wherein one or more of the reactant stream, or the first oxygen-containing stream is adjusted such that the residual $NH_3$ content of the first product stream is less than 100 ppm.

10. The process of claim 7, wherein one or more of the reactant stream, or the first oxygen-containing stream is adjusted such that the formed HCN content of the first product stream is less than 1400 ppm.

11. The process of claim 8, wherein one or more of the reactant stream, or the first oxygen-containing stream is adjusted such that the formed NO content of the first product stream is less than 200 ppm.

12. The process of claim 1, wherein the composition of the first product stream is analysed continuously or at intervals of 5 seconds or less.

13. The process of claim 1, wherein the fuel stream is co-reacted with the gas stream and first oxygen-containing stream.

14. The process of claim 13, wherein the ratio of the fuel stream to the $NH_3$ containing gas stream is such as to maintain a reaction temperature in the range of 950 to 1700° C.

15. The process claim 13, wherein the fuel stream comprises at least one selected from the group consisting of hydrocarbons, hydrogen sulphide, carbon monoxide and hydrogen gas.

16. The process of claim 1, wherein the second oxygen-containing stream is reacted in an amount such that the residual amount of oxygen in the second product stream is at least 0.5 volume %.

17. The process of claim 1, wherein a waste gas is co-reacted with the second oxygen-containing stream.

18. The process of claim 1, wherein reaction heat of the first incineration step and/or the second incineration step is recovered.

19. An $NH_3$ incinerator comprising:
a. a first reaction zone 100 comprising: a burner 110 for incinerating $NH_3$; an inlet 120 at the burner 110 for a first oxygen-containing stream, provided with a first oxygen control means 121 for adjusting the amount of the first oxygen-containing stream; an inlet 130 at the burner 110 for a gas stream comprising $NH_3$ optionally provided with a first $NH_3$ control means 131 for adjusting the amount of the $NH_3$-containing gas stream; an inlet 140 at the burner 110 for a fuel stream optionally provided with a first fuel control means 141 for adjusting the amount of the fuel stream; an outlet 160 downstream of the reaction zone 100 for a first product stream prepared in the reaction zone 100; an analyser 170 at the end of the reaction zone 100 capable of analyzing the content of $NH_3$ and/or HCN and/or NO in the first product stream prepared in the reaction zone 100 and capable of adjusting one or more of the first control means 121, 131 and 141; and optionally a temperature control means 180 downstream of the reaction zone 100; and
b. a second reaction zone 200 downstream of the first reaction zone 100 for incinerating the first adjusted product stream prepared in the reaction zone 100, comprising: an inlet 230 at the start of the second reaction zone 200 for the first adjusted product stream prepared in the first reaction zone 100; an inlet 220 at the start of the second reaction zone 200 for a second oxygen-containing stream, optionally provided with a second control means 221 for adjusting the amount of the second oxygen-containing stream; optionally a second burner 210 provided with an inlet 211 at the second burner 210 for a third oxygen-containing stream, and an inlet 212 at the second burner 210 for a second fuel stream; optionally an inlet 250 at the start of the reaction zone 200 for a waste stream; an outlet 260 downstream of the reactor zone 200 for a second product stream prepared in the reaction zone 200; optionally an analyser 270 at the end of the reactor zone 200 capable of analyzing the content of oxygen in the second product stream prepared in the reaction zone 200 or an analyser 270 at the end of the reactor zone 200 capable of analyzing the content of oxygen in the second product stream prepared in the reaction zone 200 and capable of adjusting the second control means 221; and optionally a waste heat boiler 280 downstream of the reactor zone 200 for recovery of reaction heat.

20. The $NH_3$ incinerator of claim 19, wherein the analyser 170 is a laser diode.

21. The $NH_3$ incinerator of claim 19, wherein both reaction zones are part of a single reactor vessel.

22. The $NH_3$ incinerator of claim 19, wherein each reaction zone is a separate reactor vessel, and wherein both reactor vessels are connected.

* * * * *